United States Patent [19]

Langmack

[11] 4,042,507
[45] Aug. 16, 1977

[54] WASTE LIQUID RENOVATOR

[75] Inventor: Charles E. Langmack, Cleveland, Ohio

[73] Assignee: Niagara Bottle Washer Mfg. Company, Cleveland, Ohio

[21] Appl. No.: 715,858

[22] Filed: Aug. 19, 1976

[51] Int. Cl.² .......................................... B01D 33/04
[52] U.S. Cl. ................................. 210/158; 210/160; 210/400; 210/407; 210/526
[58] Field of Search ............... 210/160, 400, 401, 526, 210/158, 407

[56] References Cited

U.S. PATENT DOCUMENTS

| | | | |
|---|---|---|---|
| 2,489,454 | 11/1949 | Henno | 210/160 X |
| 2,885,080 | 5/1959 | Goldman | 210/400 X |
| 2,929,507 | 3/1960 | Komline | 210/400 |
| 3,225,928 | 12/1965 | Black | 210/400 X |
| 3,464,557 | 9/1969 | Fowler | 210/401 X |
| 3,464,563 | 9/1969 | Dahlem et al. | 210/400 |
| 3,526,589 | 9/1970 | Meller et al. | 210/160 X |
| 3,976,573 | 8/1976 | Miller | 210/160 |

*Primary Examiner*—Theodore A. Granger
*Attorney, Agent, or Firm*—Baldwin, Egan, Walling & Fetzer

[57] ABSTRACT

This invention discloses apparatus for freeing water or other liquids of accumulated water-borne matter so that the liquid may be used again. It comprises a liquid holding tank through which an inclined conveyor belt of fine mesh woven wire runs upwardly in an inclined manner from a zone near the bottom of the tank at the waste water input end to a discharge zone at a higher point in the tank on the opposite side, and thereafter the conveyor belt runs horizontally for a short distance and then turns upon itself for a return run back to the lower portion of the tank where it started. The collected floating refuse is filtered out by passing through both runs of the conveyor belt and is washed off at the upper end of the belt into a collecting refuse collector.

5 Claims, 4 Drawing Figures

WASTE LIQUID RENOVATOR

The object of this invention is to improve on the waste water renovator as shown in U.S. Pat. No. 2,885,080, granted May 5, 1959 to Myron William Goldman. This invention does away with the parallel chain drives of the Goldman device and uses two runs of the conveyor belt to filter the refuse material from the waste water.

Other objects and advantages of this invention will be apparent from the accompanying drawings and set forth in the description and the essential features will be defined in the appended claims.

In the drawings,

FIG. 3 is a fragmental sectional view, enlarged, taken along the line 3—3 of FIG. 2 showing the sealing brushes along the sides of the upwardly moving run of the conveyor belt; while

Figure 1:
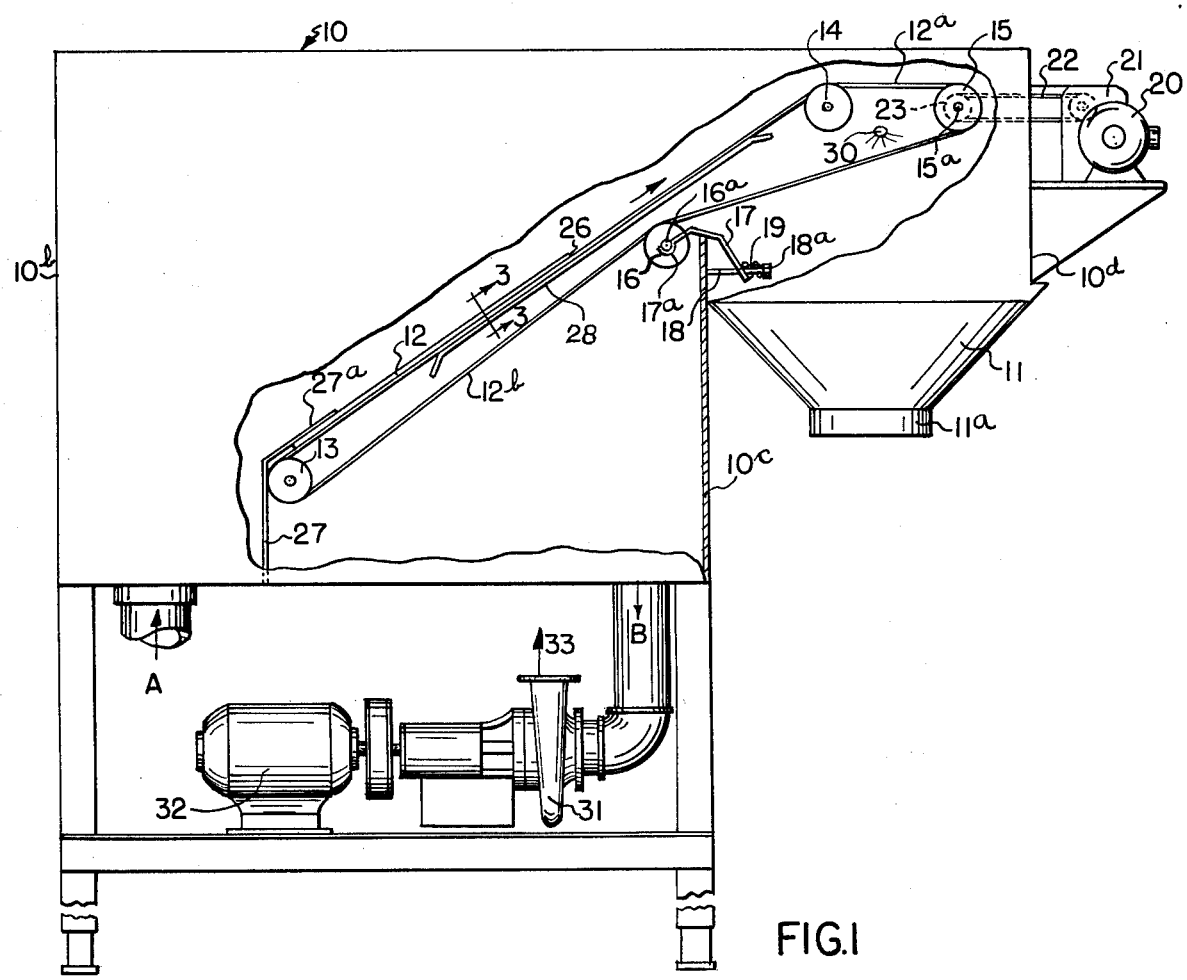
FIG. 1 is an elevational view partly in section showing the construction of the apparatus of the present invention.
Figure 2:
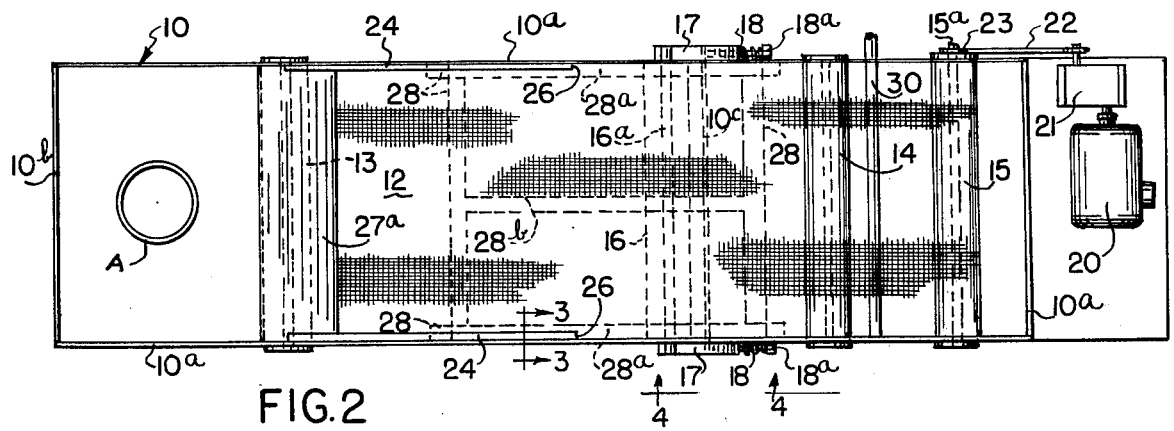
FIG. 2 is a top plan view of the structure of FIG. 1.

FIGS. 1 and 2 show a tank 10 having parallel vertical side walls 10a and an end wall 10b at the input end of the device and an opposite partial end wall at 10c and another endwall above the level of 10c as shown at 10d. The structure between the walls 10c and 10d forms a refuse collector 11. A drain 11a is provided at the bottom.

Figure 4:
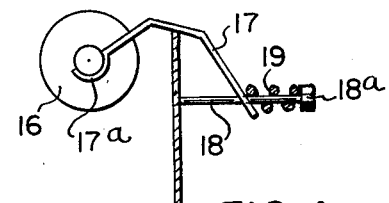
FIG. 4 is an enlarged view of the tightener rollers seen in FIG. 1.

An endless moving filtering conveyor 12 of fine mesh wire is supported on cross-wise rollers 13 at the lower end and 14 at the upper end of the incline, followed by a horizontal portion of the conveyor at 12a which runs over a drive roller 15 and then back on a return run of the conveyor 12b passing over an idler and tightener roller 16. Means is provided to cause the roller 16 to press upwardly on the return run of the conveyor and in this case this is shown as a bent plate 17 at opposite sides of the conveyor, each having its lower end fixed by a pin 18 having a head 18a which supports a compression spring 19 between the head 18a and the plate 17 so as to cause the plate to tend to move clockwise as seen in FIG. 1. The opposite end of the plate 17 is bent to provide a cup 17a to support opposite ends of the shaft 16a of the roller 16. See FIG. 4.

The drive roll 15 is driven from motor 20 through a speed reducer 21 which drives the chain 22 which passes over a drive sprocket 23 which causes rotation of the roller 15.

Figure 3:
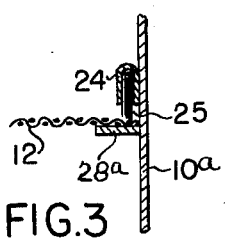

The conveyor belt 12 travels closely against the opposite parallel side walls 10a of the tank, a clearance of about 1/16 of an inch being preferred here. Means is provided along these opposite edges of the conveyor belt to seal the side edges of the conveyor to prevent collection of refuse there. This sealing means is shown in FIGS. 2 and 3 as comprising downwardly opening channels 24 each crimped to hold a plurality of coarse stiff Nylon bristles 25 extending downwardly to brush the sides of the belt 12 as it passes on the upward incline. These brushes extend from just above the roller 13 in FIG. 1 up a little more than half way along the upward incline of the belt to a zone indicated at 26.

A baffle 27 extends entirely across the tank 10 and extends from the bottom of the tank upwardly to a point just over the roller 13 and then it is bent inclined upwardly parallel to belt 12 as shown at 27a in FIG. 1. The purpose of this baffle is to see that the floating refuse in the waste water is compelled to pass downwardly through the filtering belt above the baffle portion 27a as seen in FIG. 1.

Preferably, a bracket 28 is provided as seen in FIGS. 1 and 2, extends across the width of the tank 10 directly beneath the conveyor belt 12 so as to prevent the belt sagging as it travels the upward incline. This bracket 28 is shown as having two spaced parallel cross bars at points along the conveyor connected by two side bars 28a along opposite sides of the tank and another parallel central bar 28b in the middle of the belt.

A cleansing spray is provided at 30 to wash off the collected refuse from the conveyor belt causing the same to fall into the refuse collector 11. This spray comprises a perforated pipe extending the full width of the belt 12 and located above the collector 11 and above the return run 12b of the conveyor and beneath the horizontal run 12a of the conveyor. It will be obvious from examining FIG. 1 that the bulk of the refuse material is collected on the top of the belt 12 on its upwardly inclined run and that side of the belt will be facing downwardly when it passes beneath the spray 30. Any refuse material collected on the return run 12b on the inclined portion thereof generally parallel to the upper incline 12, will be fine enough to have passed through the belt run 12 and therefore, although it is on the upper side of the belt beneath the spray 30, the spray can drive the fine refuse material back downwardly through the return run of the belt 12. The pressure of the wash water in the spray 30 is preferably at about 10 to 15 pounds per square inch.

The belt 12 is of a fine wire mesh and may be between 60 meshes per inch in one direction and 84 meshes per inch in the other direction or it may be 84 meshes per inch in each direction, or 155 meshes per inch in each direction.

One use for the machine of this invention is in connection with a bottle washing operation wherein recycled bottles are washed in a water bath which loosens all paper material on the outside of the bottle. In such a use, the waste water containing refuse, mostly paper, is fed by gravity into the apparatus of FIGS. 1 and 2 through the inlet pipe A, in this case by gravity. Meanwhile, renovated water is removed from the tank 10 through the outlet B and a pump 31 driven by a motor 32. The suction at B causes a flow of water through the inlet A and the left-hand end of the tank 10 as seen in FIG. 1 and then through the upper run 12 of the conveyor belt and through the return run 12b of the conveyor belt, thus removing about 97 percent of the refuse material so that the renovated water in a fairly clean condition passes out of the tank 10 at the outlet B. The discharge from the pump at 33 may go back to the bottle washing tank in this particular embodiment.

The present invention has a number of advantages over the Goldman U.S. Pat. No. 2,885,080. One advantage is in ease of operation because the present device does not use any sprockets and drive chains on the conveyor belt, as in Goldman, which chains and sprockets wear out and have to be replaced. Another advantage is that the angle of the conveyor belt in the present apparatus is about 30° to the horizontal whereas Goldman has a belt at about 45° angle and thus the present device decreases the overall height of the apparatus. The present invention filters the refuse material, such as paper, successively through two layers of the conveyor belt whereas Goldman only has one filtering layer. The present invention removes about 5% more solid refuse matter than Goldman, or a total of about 97% of the total refuse in the waste water. The present invention provides for an increase of water flow through the apparatus of about 60% over that possible in the Goldman apparatus.

What is claimed is:

1. In a waste liquid renovator, a tank having an input side and an output side, means for introducing waste liquid containing floating refuse at said input side into a waste liquid portion of said tank, a movable filtering conveyor of wire mesh having cross-wise roller supports guiding said conveyor in an upward inclined run moving from a zone nearer the bottom of said tank on the input side to a zone nearer the top of said tank on the output side, said conveyor having a generally horizontal run downstream from said upper zone, said conveyor then having a return run inclined downwardly to said lower zone and there transversing a bottom support roller, means for driving said conveyor, an impervious baffle extending entirely across said tank and extending between said waste liquid portion and a renovated liquid portion of said tank, said baffle extending from the bottom of said tank to a zone above said bottom support roller and on the waste liquid side of said last named roller, said baffle being bent over closely on top of said upward inclined run for a short distance, means for pumping renovated liquid from said renovated liquid portion of said tank beneath said return run of said conveyor and out of said tank, a refuse collector beneath said conveyor horizontal run on the output side of said tank communicating with said tank only from just beneath said conveyor and outward therefrom, a cleaning spray above said collector above said return run of said conveyor and below said horizontal run, whereby renovated liquid is pumped out of said renovated liquid portion of said tank beneath said two conveyor runs while waste liquid enters said waste liquid portion of said tank at said input side, refuse is collected on both of said conveyor runs and washed off into said collector.

2. A liquid renovator as defined in claim 1, wherein said filtering conveyor is of wire mesh between about 60 by 84 meshes per inch and 84 by 84 meshes per inch.

3. A liquid renovator as defined in claim 1, wherein said conveyor travels closely against opposite parallel side walls of said tank, and sealing linear brushes are positioned along said opposite side edges of said conveyor having downwardly extending bristles engaging said conveyor and preventing collection of refuse there.

4. A liquid renovator as defined in claim 1, wherein said conveyor belt is inclined upwardly at an angle of about 60° to the horizontal.

5. A liquid renovator as defined in claim 4, wherein said return run of said conveyor for a major portion thereof is substantially parallel to said upwardly inclined run.

* * * * *